Sept. 11, 1945.  S. G. ISSERSTEDT  2,384,622
CONTROL SYSTEM
Filed March 26, 1943  4 Sheets-Sheet 1

INVENTOR.
Siegfried G. Isserstedt
BY George H. Fisher
Attorney

Sept. 11, 1945.　　　S. G. ISSERSTEDT　　　2,384,622
CONTROL SYSTEM
Filed March 26, 1943　　　4 Sheets-Sheet 4

Fig. 4.

INVENTOR.
SIEGFRIED G. ISSERSTEDT
BY George H. Fisher
ATTORNEY

Patented Sept. 11, 1945

2,384,622

UNITED STATES PATENT OFFICE 2,384,622

CONTROL SYSTEM

Siegfried G. Isserstedt, Toronto, Ontario, Canada, assignor to Minneapolis-Honeywell Regulator Company, Minneapolis, Minn., a corporation of Delaware Application March 26, 1943, Serial No. 480,667

13 Claims. (Cl. 172—239)

This invention relates to position control systems, in which the position of a controlling member regulates the position of a controlled member which is usually located at a distance from the controlling member.

An object of the present invention is to provide a self-balancing remote position control system in which the controlled member may be more accurately positioned than in remote position control systems of the prior art.

A further object of the present invention is to provide a self-balancing remote position control system in which the position of the controlled member may be varied in a very large number of relatively small finite steps.

Another object is to provide an improved self-balancing remote position control system of the type in which the power available to position the controlled member is not dependent upon either the power supplied by the controlling member or the power applied to the controlled member.

Another object of the present invention is to provide an improved self-balancing remote position control system in which the movable controlling and following members are continuously rotatable.

Another object is to provide, in a remote position control system, an improved transmitter and receiver unit, comprising an elongated impedance element curved to form a substantially complete circle having a gap at the terminals of the element, sliders for cooperating with said element, and means for making the receiver slider jump the gap between the terminals of its impedance element when the transmitter slider moves through a corresponding range of positions.

A still further object is to provide, in such transmitter and receiver units, a variable impedance comprising an elongated resistance element with tap connections at spaced points thereon and a series of spaced arcuate contact segments connected in sequence to said taps and forming a substantially complete circle, so that the impedance is adjusted in a series of finite steps as a slider moves over the segments.

Figure 1:
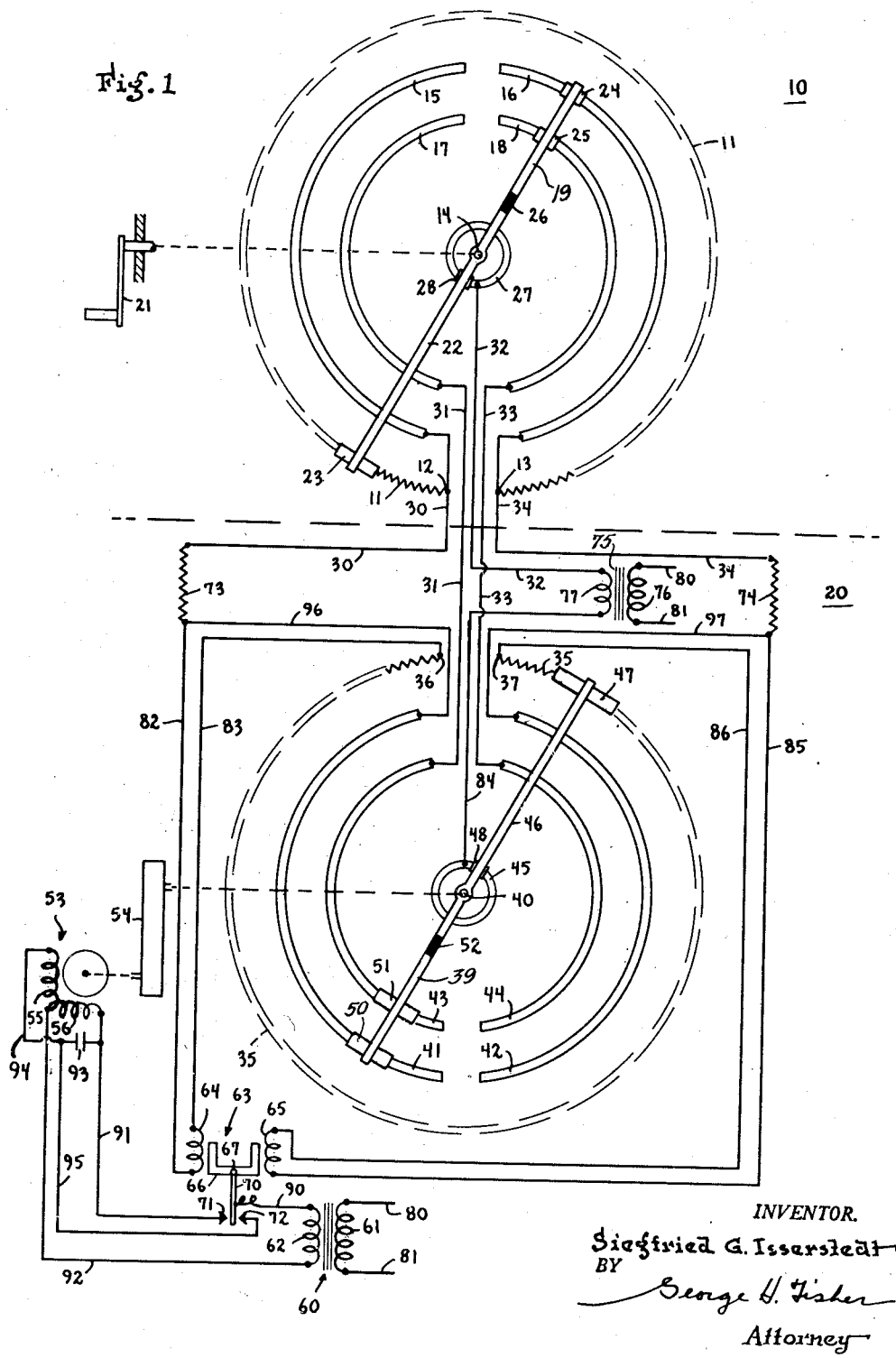
Figure 2:
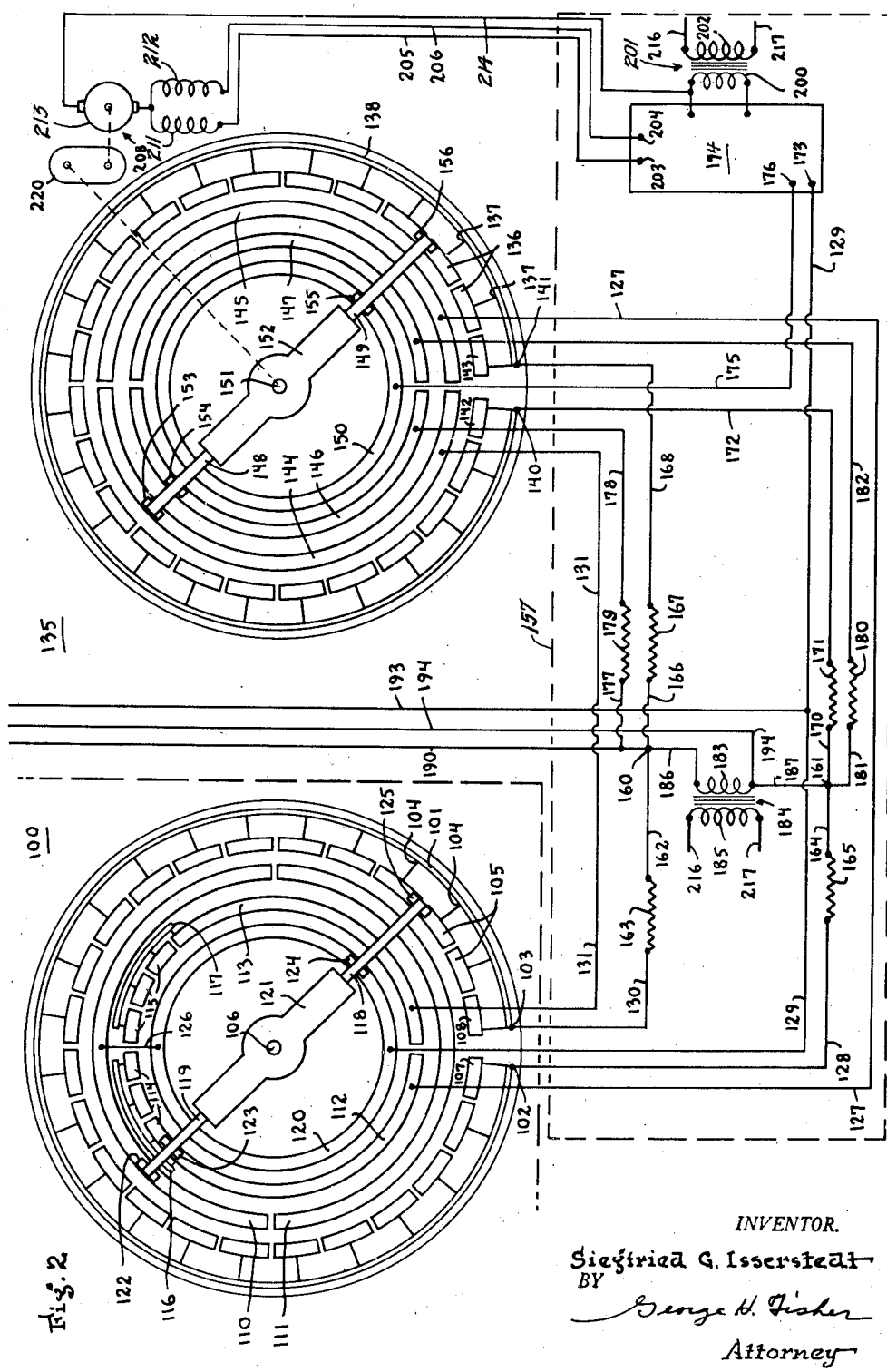
Figure 3:
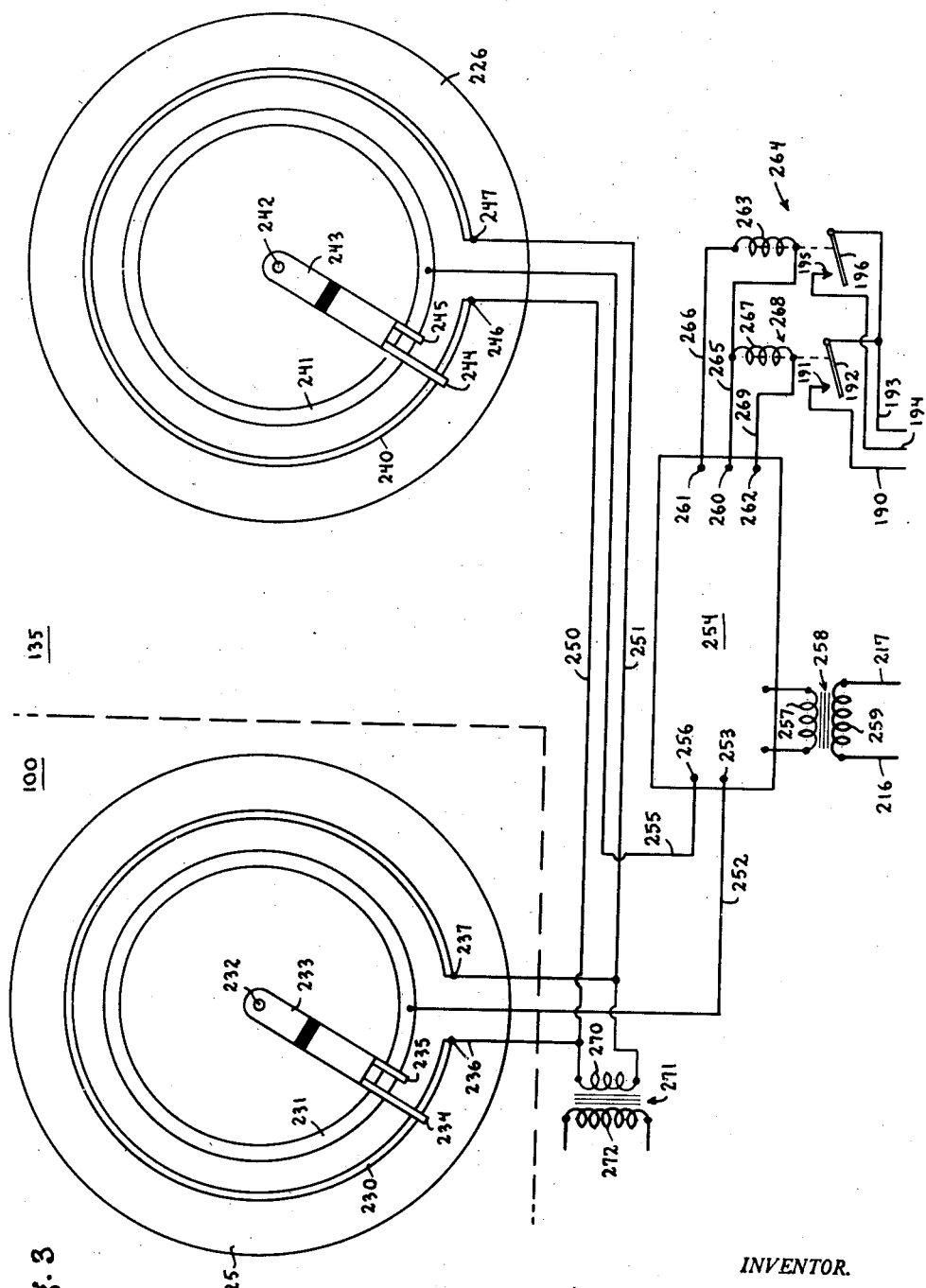

Other objects and advantages of my invention will become apparent from a consideration of the appended claims, specifications and drawings, in which Figure 1 represents, somewhat diagrammatically, a remote position control system including a simplified embodiment of my invention, Figure 2 represents, somewhat diagrammatically, a portion of a remote position control system including a preferred embodiment of my invention, Figure 3 represents diagrammatically another portion of the remote position control system, part of which is shown in Figure 2, and Figure 4 is a schematic showing of a complete control system embodying the portions shown in Figures 2 and 3.

Referring now to Figure 1, there is shown a transmitter unit 10 and a receiver unit 20, which may be located remotely from the transmitter. The transmitter unit 10 includes an elongated resistance element 11, of substantially circular form, having a pair of terminals 12 and 13. The resistance element 11 extends almost completely around a circle about a shaft 14 as a center, with only a relatively small gap between the terminals 12 and 13. The transmitter 10 is also provided with two pairs of semi-circular contact segments 15, 16 and 17, 18. These contact segments are mounted concentrically with the resistance element 11. The segments 15 and 16 are of equal radius, and the segments 17 and 18 are of equal radius. The ends of both sets of segments of equal radius are spaced apart, and the spaces between the ends of the segments are aligned with the space between terminals 12 and 13 of resistance element 11, or are diametrically spaced therefrom.

The shaft 14 may be rotated by any desired device whose motion is to be transmitted to the receiver unit 20, as for example, a hand crank 21. Fixed on the shaft 14 so as to be rotated therewith is a two-part slider arm, 19—22. Supported at one end of the arm 22 is a slider 23 adapted to engage the resistance element 11. This slider 23 is not quite long enough to bridge the gap between terminals 12 and 13. Supported at the end of the arm 19 are a pair of brushes 24 and 25. Brush 24 is adapted to engage the contact segments 15 and 16, while the brush 25 is adapted to engage the contact segments 17 and 18. Brushes 24 and 25 are slightly shorter than the gaps between contact segments 15 and 16 and 17 and 18 respectively. The two parts of the slider arm 19—22 are electrically insulated by an insert 26 of insulating material.

The transmitter 10 is also provided with a circular contact ring 27, concentric with shaft 14, and the arm 22 which carries the slider 23 also carries a brush 28 cooperating with the contact ring 27.

Five conductors, numbered 30, 31, 32, 33 and 34, connect the transmitter 10 with the receiver 20. At the transmitter, conductor 30 is connected to terminal 12 of resistance element 11, and to contact segment 15. Conductor 31 is connected to contact segment 17, conductor 32 is connected to contact ring 27, conductor 33 is connected to contact segment 18, and conductor 34 is connected to contact segment 16 and to terminal 13 of resistance element 11.

The receiver unit 20 includes an elongated resistance element 35, having terminals 36 and 37. The resistance element 35 is arcuate, forming a circle which is substantially complete except for a small gap between the terminals 36 and 37. At the center of the circle formed by the resistance element 35 is a shaft 40. Concentric with the resistance element 35 about the shaft 40, are two pairs of substantially semi-circular contact segments 41, 42 and 43, 44. The segments 41 and 42 are of equal radius, and the segments 43 and 44 are of an equal radius different from that of segments 41 and 42. A contact ring 45 is also concentric with the shaft 40.

Fixed on the shaft 40 so as to rotate therewith is a two-part slider arm 39—46. Arm 46 carries a slider 47 cooperating with the resistance element 35 and a brush 48 cooperating with the contact ring 45. Slider 47 is sufficiently long to completely bridge the gap between terminals 36 and 37. The other slider arm 39 carries a brush 50 cooperating with the contact segments 41, 42, and a brush 51 cooperating with the contact segments 43, 44. An insert 52 of insulating material electrically separates the two parts of the slider arm 39—46.

The brush 50 is sufficiently long to bridge the gap between the lower ends of segments 41 and 42, but is shorter than the gap between the upper ends of such segments. Similarly, the brush 51 is sufficiently long to bridge the gap between the lower ends of segments 43 and 44, but is shorter than the gap between the upper ends thereof.

The shaft 40 is rotated by a reversible motor 53 acting through a gear train schematically indicated at 54. Motor 53 is shown as being of the split-phase type, and has a pair of field windings 55 and 56 which are separated 90 electrical degrees in space. Power is supplied to motor 53 from a transformer 60 having a primary winding 61 and a secondary winding 62. The direction of rotation of motor 53 is controlled by a balanced relay 63.

The relay 63, which may be of the type disclosed in the patent to Willis H. Gille, No. 2,169,141, dated August 8, 1939, has a pair of opposed windings 64 and 65 which control the position of a balanced armature 66, pivoted at a point 67. Armature 66 carries a switch arm 70 which is selectively engageable with either of a pair of stationary contacts 71 and 72, depending upon the position of armature 66 with respect to its pivot 67.

A pair of fixed resistance elements 73 and 74 are shown as being included in the receiver unit 20, although they might with equal facility be included in the transmitter unit 10.

The transmitter 10 and the receiver 20 may be supplied from any suitable source of direct or alternating electrical energy. By way of example, there is shown a transformer 75 having a primary winding 76 and a secondary winding 77. Both primary winding 76 of transformer 75 and primary winding 61 of transformer 60 may be connected to any suitable source of alternating electrical energy, such as supply lines 80 and 81.

Resistance element 11 of transmitter unit 10 and resistance element 35 of receiver unit 20, together with their circuit connections, form a balanced electrical network, which may be termed a kind of bridge circuit. This balanced network includes a pair of branches connected in parallel to the secondary winding 77 of transformer 75. Each of these parallel branches includes one of the windings 64 and 65 of the balanced relay 63. When the current in the two branches is equal, the armature 66 of relay 63 is at its central position, in which switch arm 70 engages neither of the contacts 71 and 72. When the current in either winding 64 or winding 65 is greater than that in the other winding, armature 66 is rotated about its pivot 67, thereby causing switch arm 70 to engage either contact 71 or contact 72.

One of the parallel branches of the balanced network may be traced from the upper terminal of transformer secondary winding 77 through conductor 32, contact ring 27, brush 28, slider arm 22, slider 23, the part of resistance element 11 between slider 23 and terminal 12, terminal 12, conductor 30, resistor 73, a conductor 82, relay winding 64, a conductor 83, terminal 36 of resistance element 35, that part of element 35 between terminal 36 and slider 47, slider 47, slider arm 46, brush 48, contact ring 45, and a conductor 84 to the lower terminal of transformer secondary winding 77.

The other parallel branch of the balanced network may be traced from the upper terminal of transformer secondary winding 77 through conductor 32, contact ring 27, brush 28, slider arm 22, slider 23, that part of resistance element 11 between slider 23 and terminal 13, terminal 13, conductor 34, resistance element 74, a conductor 85, relay winding 65, a conductor 86, terminal 37 of resistance element 35, that part of resistance element 35 between terminal 37 and slider 47, slider 47, slider arm 46, brush 48, contact ring 45 and conductor 84 to the lower terminal of transformer secondary winding 77.

The resistance of element 11 is preferably equal to that of resistance element 35. The resistance of elements 73 and 74 is somewhat greater than twice the resistance of either element 11 or element 35. The reason for this relationship between the resistances of the various elements will become apparent from a consideration of the operation of this system.

*Operation of Figure 1*

From the preceding description, it should be apparent that the junctions of the two parallel branches in the balanced network are the sliders 23 and 47. When the slider arms 22 and 46 are at corresponding angular positions, as shown in the drawings, the resistances in the two parallel branches between the sliders 23 and 47 are equal. For example, in the position shown in the drawings, the first parallel branch includes three resistances; namely, the small portion of resistance element 11 between slider 23 and terminal 12, resistance 73, and the large portion of resistance element 35 between terminal 36 and slider 47. On the other hand, the second parallel branch also includes three resistances; namely, the large portion of resistance element 11 between slider 23 and terminal 13, resistance 74, and the small portion of resistance element 35 between terminal 37 and slider 47. The resistance of the small portion of element 11 is equal to the resistance of the small portion of element 35, and the resistance of the large portion of element 11 is equal to the resistance of the large portion of element 35. Furthermore, resistance 73 equals resistance 74. Therefore, the resistances of the two paths are equal, and the currents flowing in the two parallel branches are also equal. Windings 64 and 65 of relay 63 are equally energized and the armature 66 is maintained at its center or neutral position, and the switch arm 70 engages neither contact 71 nor contact 72.

Under these conditions, let it be assumed that the slider arm 22 moves a short distance counter-clockwise, thereby moving slider 23 towards the terminal 12 of resistance element 11. When such a movement takes place, the resistance in the first parallel branch of the balanced circuit is decreased, while the resistance in the second parallel branch is increased. Therefore, more current flows in the first parallel branch and less current flows in the second parallel branch. The attractive force of winding 64 on armature 66 increases, while the attractive force of armature 65 decreases, and armature 66 is rotated clockwise about its pivot 67, bringing switch arm 70 into engagement with stationary contact 71.

Engagement of switch arm 70 with contact 71 completes an energizing circuit for the windings of motor 53. The circuit for winding 56 may be traced from the upper terminal of transformer secondary winding 62, through a conductor 90, switch arm 70, contact 71, a conductor 91, winding 56, and a conductor 92 to the lower terminal of transformer secondary winding 62. The energizing circuit for winding 55 may be traced from the upper terminal of transformer secondary winding 62 through conductor 90, switch arm 70, contact 71, conductor 91, a condenser 93, a conductor 94, winding 55, and conductor 92 to the lower terminal of transformer secondary winding 62. The energizing current flowing through winding 55 is displaced in phase approximately 90 electrical degrees by the condenser 93, from the current flowing through winding 56. In accordance with the well known characteristics of split-phase condenser motors, this difference in phase between the currents in windings 55 and 56 causes rotation of motor 53 in a predetermined direction. In this case, the direction is such that the gear train 54 rotates shaft 46 counter-clockwise, thereby driving slider arm 46 toward an angular position corresponding to that assumed by slider arm 22.

This movement of slider arm 46 increases the resistance in the first parallel branch of the balanced network, and decreases the resistance in the second branch, thereby tending to rebalance the network. When the slider arm 46 reaches an angular position corresponding to that of the new position of slider arm 22, the network is again balanced, and the armature 66 moves back to its center position, thereby de-energizing motor 53, and stopping the movement of slider arm 46.

On the other hand, when the slider arm 22 moves clockwise from the position shown, the resistance in the first parallel branch of the balanced circuit is increased, while the resistance in the second branch is decreased. The current flowing through winding 64 of relay 63 is accordingly decreased, while the current in winding 65 is increased. Armature 66 therefore rotates counter-clockwise, moving switch arm 70 into engagement with contact 72.

Engagement of switch arm 70 with contact 72 completes energizing circuits for the windings 55 and 56 of motor 53. The circuit for winding 55 may be traced from the upper end of transformer secondary winding 62, through conductor 90, switch arm 70, contact 72, a conductor 95, conductor 94, winding 55 and conductor 92 to the lower end of secondary winding 62. The circuit for winding 56 may be traced from the upper end of secondary winding 62, through conductor 90, switch arm 70, contact 72, conductor 95, condenser 93, winding 56, and conductor 92 to the lower end of secondary winding 62.

Condenser 93 is now in series with winding 56, while winding 55 is connected to the power supply directly. The phase relations of the currents in the windings 55 and 56 are therefore reversed with respect to the phase relations existing under the conditions previously described, and the motor rotates in the opposite direction, turning shaft 46 clockwise so as to bring slider arm 46 into angular agreement with slider arm 22.

Now let it be assumed that the slider arm 22 is continuously moved counter-clockwise from the position shown in the drawings. The slider arm 46 is driven by motor 53 to follow this motion until the slider 23 moves out of engagement with terminal 12 of slider 11. At that point, the circuits through both parallel branches of the balanced network are broken, since the slider 23 is slightly narrower than the gap between terminals 12 and 13. Both windings 64 and 65 of relay 63 are therefore de-energized, and motion of slider 46 is stopped with slider 47 in engagement with terminal 37.

When slider 23 moves across the gap and engages terminal 13, the resistance of the first parallel branch of the balanced network is greatly increased, since it includes all of both resistance elements 11 and 35. The second parallel branch, on the other hand, includes only the resistance 74. If means were not provided to prevent it, this would greatly reduce the current through winding 64 of relay 63, and greatly increase the current through winding 65. Switch arm 70 would then engage contact 72, thereby energizing motor 53 for operation in a sense to drive the slider arm 46 clockwise. This would cause slider arm 46 to move in a direction opposite to that in which slider arm 22 was moving, thereby destroying the whole effect of the remote position control system.

Means are provided, however, to prevent such an undesirable operation of the control circuit. As slider 23 engages terminal 13 of resistance element 11, the brushes 24 and 25 move into engagement with the upper ends of contact segments 15 and 17, respectively, thereby completing a connection shunting the resistance element 73 in the first parallel branch of the balanced network. This shunt connection may be traced from the upper terminal of resistance 73 through conductor 30, contact segment 15, brush 24, slider arm 19, brush 25, contact segment 17, conductor 31, contact segment 43, brush 51, slider arm 39, brush 50, contact segment 41, and a conductor 96 to the lower terminal of resistance element 73. The first parallel branch of the balanced network then includes only the resistance elements 11 and 35, while the second parallel branch includes only the resistance element 74. Since the resistance of element 74 is somewhat greater than twice that of element 11, which is equal to that of element 35, it will be seen that the resistance in the second parallel branch is greater than that in the first parallel branch. Therefore, the current in the first parallel branch is greatest, and relay winding 64 is energized more highly than relay winding 65. Contact arm 70 is thereby moved into engagement with contact 71, causing motor 53 to be energized for operation in a direction to drive slider arm 46 counter-clockwise, thereby moving it across the gap between terminals 36 and 37 toward a position corresponding with the position of slider arm 22.

In a similar manner, if the slider 23 crosses the gap in a clockwise direction, while the slider 47 is on the left side of its associated gap, opposite the position shown in the drawings, a connection is completed shunting the resistance element 74. This connection may be traced from the upper terminal of resistance element 74, through conductor 34, contact segment 16, brush 24, slider arm 19, brush 25, contact segment 18, conductor 33, contact segment 44, brush 51, slider arm 39, brush 50, contact segment 42, and a conductor 97 to the lower terminal of resistance element 74. Shunting of resistance 74 reduces the resistance of the second parallel branch of the balanced network below that of the first parallel branch, thereby causing energization of relay winding 65 to be greater than that of winding 64. Switch arm 70 is thereby operated into engagement with contact 72, causing motor 53 to rotate in a direction to drive slider 46 in a clockwise direction across its gap.

As stated above, the slider 23 and the brushes 24 and 25 of transmitter 10 are narrower than the gaps in their associated contact segments and in resistance 11, while in the receiver 20 the slider 47 and the brushes 50 and 51 are wider than the gaps in their associated resistor and the lower ends of the contact segments. If it were possible for the slider 23 to shunt the gap in the resistance element 11, the position of slider 47 would control the relay 63 at such times, and the motor 53 would be operated in a direction to move slider 46 towards its center position, meaning the position at the center of slide wire 35. Such an effect is, of course, undesirable, as it is intended that the slider arm 46 follow the slider 22 as closely as possible at all times. Also, if the brushes 24 and 25 were wider than their respective gaps, it would be possible to shunt both of the resistors 73 and 74 simultaneously. If this occurred, there might possibly follow a condition in which one of the relay windings 64 and 65 was connected directly across the transformer terminals without any resistance in series therewith. Such an occurrence might of course cause damage to the relay and possibly to other equipment. Therefore, the slider 23 and the brushes 24 and 25 are made narrower than their respective gaps.

On the other hand, it is necessary that the slider arm 46 be able to start up again if it should stop in the middle of its associated gap. If the slider 47 were narrower than the gap in slide wire 35, both the circuits to relay windings 64 and 65 would be broken when the slider arm 46 stopped with the slider 47 in the center of the gap, and the receiver would thereafter remain stationary, as no movement of the transmitter could possibly cause energization of the relay 63. Therefore, the slider 47 must be made wider than the gap in the slide wire 35. Similarly, the brushes 50 and 51 should be made wider than the gaps in which they stop when the slider 47 is at the center of the gap in slide wire 35, in order that, when starting up from that position, they may start in the proper direction. For example, when both slider arm 22 and slider arm 46 are in the centers of their associated slide-wire gaps, either resistance 73 or 74 may be shunted upon movement of slider 23 in one direction or the other, thereby insuring a responsive movement of slider arm 46 in the proper direction to follow slider arm 22.

Figures 2, 3 and 4

I have shown in Figure 2 a modification of the system shown in Figure 1, in which the relay means controlling the receiver motor is an electronic amplifier, rather than the more conventional relay used in the case of Figure 1. In the system of Figure 2, a different type of balanced electrical network is used, which produces a voltage proportional to its unbalance, rather than the balanced network of Figure 1, which produces a pair of currents, whose difference is the measure of the unbalance of the network. Also, in the system shown in Figure 2, the variable resistance elements of the transmitter and receiver are tapped at spaced intervals, and the taps are connected to arcuate contact segments arranged in the form of a circle. By the use of this type of variable resistance and contact structure, I have provided a circuit in which a predetermined value of unbalance voltage is produced when the network is unbalanced by a given amount, and in which the unbalance voltage of the network is varied in a series of substantially equal finite steps.

Slide-wires, such as those shown in Figure 1, wear unevenly, and after a long period of use the surface of the slide-wire is in effect a series of contact surfaces unevenly spaced along the length of the resistance. This uneven wear of the slide-wire produces irregular unbalancing effects on the network, depending upon the position of the transmitter and receiver sliders. Such irregular response of the network is prevented by the use of the tapped resistor and arcuate contact segments shown in Figure 2.

In Figure 2 are shown a transmitter 100 and a receiver 135. In the transmitter 100 is an elongated resistance element 101, which is shown for convenience as being arranged substantially in the form of a circle, leaving only a small gap between its terminals 102 and 103. The resistance 101 is tapped at equally spaced intervals, as shown at 104, and each of the taps 104 is connected to an arcuate contact segment 105. The segments 105 are arranged in the form of a circle about a shaft 106.

Two of the arcuate segments, numbered 107 and 108, are connected respectively to the terminals 102 and 103 of the resistance element 101. The segments 107 and 108 are hereinafter referred to as terminal segments. For the sake of clarity in describing the structure and operation of my invention, the terminal segments 107 and 108 are shown as more widely separated than the segments 105. It should be understood, however, that this wider spacing is not necessary, but that uniform spacing may be used between all segments.

Arranged concentrically about the shaft 106 are three rows of contact segments and a contact ring 120. The first, or outer, row comprises the segments 105; the second comprises a pair of semi-circular segments 110 and 111, and the third row includes two semi-circular groups of segments. The ends of the semi-circular segments 110 and 111 are spaced from each other, this space being displaced by an angle of 90° from the space between the terminal segments 107 and 108. Each of the groups in the third row consists of a long segment and three short segments. The long segments are numbered 112 and 113 in the drawings, while the short segments of each group are numbered 114 and 115, respectively. Associated with the segments 112 and 114 is a resistance element 116, hereinafter referred to as a compensating resistance, which is tapped at spaced intervals, each tap being connected to one of the segments 112 and 114. Similarly, a compensating resistance element 117 is associated with the segments 113 and 115, the resistance element 117 being tapped at spaced intervals and each tap being connected to one of the segments.

Fixed on the shaft 106 so as to rotate therewith is an arm 121 of electrically insulating material, carrying a pair of diametrically opposite extensions 118 and 119, of electrically conductive material. Extension 118 carries a pair of brushes 124 and 125, and extension 119 carries a pair of brushes 122 and 123. The brush 122 cooperates with the segments 110 and 111. The brush 123 cooperates with the third row of contact segments, including the segments 112, 113, 114 and 115. Brush 124 cooperates with contact ring 120 and brush 125 cooperates with the outer row of contact segments 105.

Segment 110 is connected to ring 120 by a conductor 126. Five conductors, 127, 128, 129, 130 and 131 are attached to various elements at the transmitter 100 and extend to the receiver 135. Conductor 127 is attached to contact segment 112. Conductor 128 is connected to terminal 102 of resistor 101. Conductor 129 is connected to contact ring 120. Conductor 130 is connected to terminal 103 of resistor 101. Conductor 131 is connected to contact segment 113.

Segment 111 is not in electrical connection with any other part of the system, but merely provides a more uniform wearing surface for the brush 122.

The receiver 135 comprises three rows of concentric contact segments and a contact ring 150. Each of the outer row of contact segments 136 is connected to one of a plurality of equally spaced taps 137 on a resistance element 138. The resistance element 138 is shown as forming a substantially complete circle, except for a small gap between its terminals 140 and 141. The terminals 140 and 141 are connected respectively to two segments 142 and 143, hereinafter referred to as terminal segments.

The second row of contact segments comprises a pair of substantially semi-circular segments 144 and 145. The ends of the segments 144 and 145 are spaced from each other, and these spaces are aligned with the space between the terminal segments 142 and 143. The third row of contact segments comprises a pair of substantially semi-circular segments 146 and 147. The segments 146 and 147 are also spaced from each other at their ends, and the spaces are aligned with the space between the terminal segments 142 and 143.

All of the segments and the contact ring 150 of the receiver 135 are concentric about a shaft 151, which carries an arm 152 of electrically insulating material, carrying a pair of diametrically opposite extensions 148 and 149, of electrically conductive material. Extension 148 carries a pair of brushes 153 and 154, and extension 149 carries a pair of brushes 155 and 156. Brush 153 cooperates with the semi-circular contact segments 144 and 145, brush 154 cooperates with segments 146 and 147, brush 155 cooperates with contact ring 150, and brush 156 cooperates with the outer row of arcuate segments 136.

The resistance element 101 of transmitter 100 and the resistance element 138 of receiver 135 are interconnected in a balanced electrical network of the Wheatstone bridge type, hereinafter referred to as the primary bridge circuit. This bridge circuit has input terminals 160 and 161, and the contact rings 120 and 150 serve as the output terminals. The customary four branches of a Wheatstone bridge circuit interconnect the input and output terminals.

The first branch of the bridge connects input terminal 160 and the contact ring 120. This branch may be traced from input terminal 160 through a conductor 162, a fixed resistance 163, conductor 130, terminal 103, a portion of resistance 101, one of the taps 104, one of the contact segments 105, brush 125, extension 118 of arm 121, and brush 124 to contact ring 120.

The second branch of the bridge circuit interconnects the input terminal 161 and contact ring 120. This branch may be traced from input terminal 161 through a conductor 164, a fixed resistance 165, conductor 128, terminal 102, a portion of resistance element 101, one of the taps 104, one of the contact segments 105, brush 125, extension 118 of arm 121, and brush 124 to contact ring 120.

The third branch of the bridge circuit may be traced from input terminal 160 through a conductor 166, a fixed resistance 167, a conductor 168, terminal 141, a portion of resistance element 138, one of the taps 137, one of the contact segments 136, brush 156, extension 149 of arm 152, and brush 155 to contact ring 150.

The fourth branch of the bridge circuit connects input terminal 161 with contact ring 150 and may be traced from terminal 161 through a conductor 170, a fixed resistance 171, a conductor 172, terminal 140, a portion of resistance element 138, one of the taps 137, one of the segments 136, brush 156, extension 149 of arm 152, and brush 155 to contact ring 150.

Contact ring 120 is connected through conductor 129 to an input terminal 173 of an electronic amplifier 174. Contact ring 150 is connected through a conductor 175 to the other input terminal 176 of amplifier 174.

While any suitable electronic amplifier may be used, I prefer to use one of the type wherein the amplifier output is varied in direct relation to the magnitude of the input signal. A suitable amplifier is shown, for example, in the F. L. Moseley Patent No. 2,088,659, issued August 3, 1937.

In addition to the four main branches of the bridge circuit, the balanced network includes means effective under certain conditions to connect additional resistance in parallel with the first branch of the bridge circuit. This additional resistance comprises a fixed compensating resistance 179 and may also include all or a part of the compensating resistance 117. In order to illustrate the conditions under which various amounts of this additional resistance are connected in the circuit, consider that the receiver slider arm 152 is in a position such that brushes 153 and 154 engage segments 144 and 146, respectively, which may, for example, be the position shown in the drawings. Now consider that the transmitter slider arm 121 has been rotated clockwise from the position shown in the drawings, to a position wherein the brushes 125, 122, and 123 engage terminal segment 107, segment 110, and the left-hand one of the three segments 115, respectively. A connection may now be traced from bridge input terminal 160 through a conductor 177, resistance 179, a conductor 178, contact segment 146, brush 154, extension 148 of arm 152, brush 153, segment 144, conductor 131, segment 113, resistance 117, the left-hand one of the three segments 115, brush 123, extension 119 of slider arm 121, brush 122, segment 110, and conductor 126 to contact ring 120, which serves as an output terminal of the bridge circuit. It should be remembered that this connection includes resistance 179 and all of resistance 117, and is in parallel with the first branch of the bridge circuit.

Now let it be assumed that the slider arm 121 is moved further in a clockwise direction, while the slider arm 152 remains in a position such that brushes 153 and 154 engage segments 144 and 146, respectively. As brush 125 moves into engagement with the next segment 105, brush 123 moves into engagement with the center one of the three segments 115, and a portion of the resistance 117 is removed from the connection just traced. As brush 125 moves into engagement with the second segment 105 to the left of terminal segment 107, brush 123 moves into engagement with the right-hand one of the three segments 115, thereby removing a second portion of resistance 117 from the connection previously traced. As brush 125 moves into engagement with the third segment 105 to the left of terminal segment 107, brush 123 moves into engagement with segment 113, thereby removing all of resistance 117 from the connection which shunts the first branch of the bridge circuit.

It will be readily understood by those skilled in the art, in accordance with the well-known characteristics of Wheatstone bridge circuits, that the potential applied to the input terminals of the bridge is divided in the same proportion between the two branches on either side of the bridge when the bridge is balanced. In other words, in the present bridge circuit, the potentials across the first and third branches are equal, and the potentials across the second and fourth branches are equal when the bridge is balanced. From the preceding description, it should be further apparent that the bridge circuit is balanced when the transmitter and receiver brushes 125 and 156 engage corresponding segments.

Now let it be assumed that the slider arms 121 and 152 are in corresponding angular positions, so that the bridge is balanced, and that these positions are such that the segments engaged by the brushes 125 and 156 are substantially displaced from the respective terminal segments. Under these conditions, if the transmitter brush 125 moves over one segment, in a clockwise direction, for example, a potential appears at the bridge output terminals whose magnitude corresponds to the potential drop across the resistance between adjacent taps 104 on the resistance element 101. If the transmitter brush 125 moves over more than one segment, the unbalance potential appearing at the bridge output terminals is proportional to the number of segments 105 corresponding to the difference in the angular positions of the transmitter and receiver slider arms. The polarity, or phase, of the unbalance potential depends upon the sense of displacement of the transmitter arm with respect to the receiver arm.

Now consider that the slider arms 121 and 152 are in corresponding angular positions such that the brushes 125 and 156 engage terminal segments 108 and 143, respectively. Now, if the brush 125 moves over one segment in a clockwise direction, it engages terminal segment 107. Under these conditions, if the connection previously traced for shunting the first branch of the bridge circuit were not completed, the resistance of the first branch would be increased, while the resistance of the second branch would be decreased, and the unbalance potential of the bridge circuit would have a magnitude and polarity corresponding to a counter-clockwise displacement of twenty-three segments between the transmitter arm and the receiver arm. The shunt connection for the first branch of the bridge circuit is completed at this time, however, and the resistances 179 and 117 are so designed and proportioned with respect to resistances 101 and 138 that the resistance of the first branch is greatly decreased, and unbalance potential of the bridge circuit is substantially equal to the unbalance potential caused by a clockwise displacement of one segment at any other angular position of the transmitter and receiver sliders. Furthermore, if the transmitter slider arm 121 continues to move clockwise while receiver brush 156 remains in contact with terminal segment 143, the amount of resistance removed from the first branch of the bridge by operation of slider 123 across segments 115 may be so designed and proportioned with respect to the resistance inserted in the second arm of the bridge by operation of brush 125 across segments 105, that the unbalance potential of the bridge remains proportional to the number of segments 105 corresponding to the difference in the angular positions of the transmitter and receiver sliders. Of course, in the modification shown, this proportion is not maintained after the brush 123 engages segment 113, but it will be readily understood by those skilled in the art that it could be maintained as far as desired by increasing the length of resistor 117 and the number of segments 115.

A similar connection is provided for shunting the second branch of the bridge circuit when the transmitter slider arm 121 moves the slider 125 across the gap between terminal segments 107 and 108 in a counter-clockwise direction and the receiver brush 156 remains on the left-hand side of the gap between terminal segments 142 and 143. In order to trace this second connection, assume that the transmitter slider arm 121 is in a position such that brushes 125, 122, and 123 engage terminal segment 108, segment 110, and the right-hand one of the three segments 114, respectively. Further assume that the receiver slider arm 152 is in a position such that brushes 153 and 154 engage segments 145 and 147, respectively. The connection for shunting the second branch of the bridge circuit may then be traced from input terminal 161, through a conductor 181, a compensating resistance 180, a conductor 182, contact segment 147, brush 154, extension 148 of slider arm 152, brush 153, contact segment 145, conductor 127, contact segment 112, resistance 116, the right-hand one of the three segments 114, brush 123, extension 119 of slider arm 121, brush 122, contact segment 110, and conductor 126 to contact ring 120, which serves as an output terminal of the bridge circuit. The effect of this connection shunting the second branch of the bridge circuit is entirely analogous to the effect of the connection shunting the first branch, and further explanation is believed to be unnecessary.

Power is supplied to the balanced network from a secondary winding 183 of a transformer 184 having a primary winding 185. The upper terminal of secondary winding 183 is connected to input terminal 160 through a conductor 186. The lower terminal of transformer secondary winding 183 is connected to input terminal 161 through a conductor 187.

Means are provided for selectively connecting either input terminal 160 or input terminal 161 of the bridge circuit directly to the output terminal represented by contact ring 120, thereby short-circuiting either the first or second branches of the bridge circuit. The connection for short-circuiting the first branch of the bridge circuit may be traced from input terminal 160 through a conductor 190, a contact 191, (see Figure 3), a switch arm 192, and a conductor 193 to conductor 129, which is connected to contact ring 120. The connection for shunting the second arm of the bridge circuit may be traced from input terminal 161 through conductors 187 and 194, a contact 195 (see Figure 3), a switch arm 196, and conductor 193 to conductor 129, which is connected to contact ring 120.

The switch arms 192 and 196 may be operated to engage their associated contacts 191 and 195 by means to be described later.

In order to simplify Figure 4 of the drawings, certain parts of this network, together with its power supply and the amplifier 174, are indicated therein as a unit 157. The contents of the unit may be ascertained by comparing Figure 3, which shows a dotted line 157 surrounding the elements which comprise the unit.

Amplifier 174 is supplied with energy from a secondary winding 200 of a transformer 201 having a primary winding 202. Primary windings 185 and 202 may both be connected to the same alternating current supply lines 216 and 217.

Amplifier 174 has output terminals 203 and 204 connected through conductors 205 and 206, respectively, to the terminals of field windings 211 and 212 of a series motor 208. The opposite terminals of windings 211 and 212 are both connected to one terminal of armature 213 of motor 208. The other terminal of armature 213 is connected through a conductor 214 to one terminal of secondary winding 200.

The amplifier 174, as previously mentioned, is preferably one in which the amplifier output is varied in direct relation to the magnitude of the input signal. Furthermore, as described in the Moseley Patent No. 2,088,659, it has a characteristic such that the relative currents passing through output terminals 203 and 204 are differentially controlled in accordance with the phase of the input signal. In other words, when no signal appears at the input terminals 173 and 176, which condition occurs when the primary bridge is balanced, the current flowing through output terminal 203 and motor field winding 211 is substantially equal to the current flowing through output terminal 204 and field winding 212. The construction of windings 211 and 212 is such that the energization of one tends to cause rotation of the motor in a direction opposite to the direction of rotation caused by energization of the other. When the bridge is unbalanced, however, a signal appears at input terminals 173 and 176, and amplifier 174 responds to this signal in such a manner as to increase the current flowing in one of the windings 211 or 212 and to decrease the current flowing through the other. The particular winding in which the current flow is increased is determined by the phase of the input signal with respect to the phase of the terminal potential of transformer secondary 200. If the input signal is substantially in phase with this terminal potential, for example, the current flow in one winding is greater, while if the input signal is opposite in phase, the current flow in the other winding is greater. It should therefore be apparent that upon unbalance of the bridge, the motor will be driven in one direction or the other, dependent upon the sense of unbalance of the bridge.

Motor 208 drives the shaft 151 through a gear train schematically indicated at 220. The connections between the bridge, amplifier, 174, and motor 208 are arranged so that upon unbalance of the bridge due to a change in angular position of the transmitter slider arm 121, the motor 208 drives the receiver slider arm 152 in the proper direction toward a corresponding angular position, thereby rebalancing the bridge.

Since the amplifier output is varied in direct relation to the magnitude of the input signal, and the magnitude of the input signal is proportional to the difference between the angular positions of the transmitter and receiver sliders, it should be apparent that the motor speed is substantially proportional to the angular displacement between the transmitter and receiver slider arms. This characteristic aids in obtaining a follow-up system in which the receiver follows the transmitter rapidly and without overshooting. For example, as the receiver approaches a balanced condition after an extreme unbalance, the energization of the motor is decreased, thereby permitting the motor to stop more quickly when the balanced condition is reached.

If desired, the bridge circuit could with equal facility utilize a direct current source of electrical energy in place of the transformer 184. If such a source were used, the amplifier 174 would respond to a difference in polarity of the unbalance potential in the same manner that it responds to a difference in phase of the alternating unbalance potential when an alternating source is used.

Figure 3 discloses a variable resistance device 225 forming a part of the transmitter unit 100, and another variable resistance device 226 forming a part of receiver unit 135. These variable resistance devices 225 and 226 are interconnected so as to form a second normally balanced electrical network connecting the transmitter and receiver units. This network is also of the Wheatstone bridge type, and is hereinafter referred to as the secondary bridge circuit.

The variable resistance device 225 includes a slide-wire resistance 230 and a contact ring 231, both of substantially circular form and mounted concentrically with respect to a shaft 232. Fixed on the shaft 232 is a slider arm 233 carrying a slider 234 adapted to engage slide-wire 230 and a slider 235 adapted to engage the contact ring 231. The contact ring 231 forms a complete circle. The slide-wire 230 forms a substantially complete circle, except for a small gap between its terminals 236 and 237.

The variable resistance device 226 of receiver 135 includes a slide-wire resistance 240 and contact ring 241, both of circular form and concentric with respect to a shaft 242. Fixed on the shaft 242 so as to rotate therewith is a slider arm 243 carrying a slider 244 which cooperates with slide-wire 240, and a slider 245 which cooperates with contact ring 241. The contact ring 241 forms a complete circle, and the slide-wire 240 forms a circle complete except for a small gap between its terminals 246 and 247.

A conductor 250 interconnects terminals 236 and 246, and a conductor 251 interconnects terminals 237 and 247. Contact ring 231 is connected by a conductor 252 to one input terminal 253 of an amplifier 254. Contact ring 241 is connected by a conductor 255 to the other input terminal 256 of amplifier 254.

The amplifier 254 may be an electronic amplifier of any suitable type; for example, one of the type shown in Figure 2 of the copending application of Albert P. Upton, Serial No. 437,561, filed April 3, 1942.

Amplifier 254 is supplied with electrical energy from a secondary winding 257 of a transformer 258 having a primary winding 259. Primary winding 259 may conveniently be connected to supply lines 216 and 217.

Amplifier 254 has a common output terminal 260 and a pair of selectively energizable output terminals 261 and 262. A winding 263 of a relay 264 is connected between output terminals 261 and 260 by conductors 265 and 266, respectively. A winding 267 of a relay 268 is connected between terminals 260 and 262 by conductors 265 and 269 respectively.

Winding 263 of relay 264 is operatively associated with contact arm 196, so that when relay winding 263 is energized, switch arm 196 is moved into engagement with contact 195. Relay 268 includes switch arm 192, so that when winding 267 is energized, switch arm 192 is moved into engagement with contact 191.

It will be seen that the variable resistance devices 225 and 226 form a balanced electrical network of the Wheatstone bridge type. This is the secondary bridge circuit previously mentioned. Power is supplied to this network from a secondary winding 270 of a transformer 271 having a primary winding 272. The terminals of the transformer secondary winding 270 form the input terminals of the secondary bridge circuit, including the resistance devices 225 and 226. The contact rings 231 and 241 form the output terminal of this secondary bridge, which are connected to the input terminals of the amplifier. When the bridge is balanced, no signal is impressed on the input terminals of the amplifier, and neither of the relays 264 nor 268 are energized. When the network is unbalanced, one or the other relays 264 and 268 is energized, the particular relay to be energized being selected in accordance with the direction of unbalance of the bridge, as described in the copending Upton application previously referred to.

Referring now to Figure 4, it will be seen that transmitter 100 includes a pointer 275 which is rotatable with respect to a stationary scale 276. Pointer 275 is fixed on a shaft 277, which is connected through a gear train, schematically shown at 278, to shaft 232 of variable resistance device 225. Shaft 232 is connected through another gear train 280 to shaft 106 of variable resistance device 101. Shaft 106 is connected through a third gear train 281 to any suitable means for driving pointer 275, which is shown, by way of example, as a hand crank 285.

In the receiver unit 135, the shaft 151 of the variable resistance device 138 drives through a gear train 286 the shaft 242 of variable resistance device 226. Shaft 242 in turn drives through a gear train 287, a shaft 288 to which is attached a pointer 290 rotatable with respect to a stationary scale 291.

*Operation of Figures 2, 3, and 4*

The ultimate function of the complete system, as disclosed in Figure 4, is to position receiver pointer 290 with respect to scale 291 so that it corresponds with the position of transmitter pointer 275 with respect to scale 276. The transmitter pointer 275 may be moved with respect to scale 276 by rotation of the hand crank 285. The ratios of the gear trains 278, 280 and 281 are such that the variable resistance device 101 rotates more slowly than the crank 285, and shaft 232 of variable resistance device 225 rotates more slowly than shaft 106, and shaft 277 carrying the pointer 275 rotates more slowly than shaft 232. The particular gear ratios chosen are immaterial except that their magnitude determines the accuracy with which pointer 275 may be positioned with respect to scale 276. For example, in one embodiment of my invention, it was desired to position a pointer accurately to within 1/40 of a degree. In such a system, if the resistance device 101 has twenty-four contact segments, the gear trains 278 and 280 should be designed so that the shaft 106 completes one revolution every time the pointer 275 passes through one eight-hundredth of a circle. In other words, a gear ratio of 800 to 1 between shafts 106 and 277 is required.

The ratio of the gear train 280 is first chosen so that when shafts 106 and 151 are displaced from each other by an angle slightly less than 180 degrees, the secondary bridge circuit is unbalanced sufficiently to cause operation of one of the relays 264 and 268. The gear train 278 is then designed to give the desired accuracy of motion of pointer 275.

It will be readily understood that gear train 287 of receiver unit 135 is built with the same gear ratio as gear train 278 of transmitter 100, and that gear train 286 of the receiver has the same gear ratio as gear train 280 of the transmitter. There need be no particular relationship between the ratio of transmitter gear train 281 and receiver gear train 220. Each of these ratios is separately determined from the amount of torque and speed available to operate the crank 285 and the torque and speed characteristics of the motor 208, respectively.

When the pointers 275 and 290 are in corresponding positions, both the primary and secondary bridge circuits are balanced, and no signal is applied to the input terminals of amplifier 174. Therefore, no power is supplied to winding 207 of motor 208, and the receiver pointer 290 remains stationary. Under these conditions, assume that hand crank 285 is rotated clockwise so as to turn pointer 275 clockwise with respect to its scale 276. This causes shaft 106 to turn counter-clockwise, as indicated by the arrows in the drawings. Let it be assumed that this motion is sufficient to move brush 125 from one of the segments 105 across the gap to the adjacent segment. This causes the primary bridge to be unbalanced by an amount corresponding to the voltage drop between two adjacent segments 105, and in a sense dependent on the direction of rotation of shaft 106. This unbalance voltage is applied to the input terminals of amplifier 174, thereby causing energization of motor 208 so as to rotate shaft 151 counterclockwise so as to follow the movement of shaft 106. As soon as shaft 151 has moved the brush 156 to a segment corresponding in angular position to that on which the brush 125 of transmitter 100 rests, the input signal at the amplifier 174 is again reduced to zero, and the motor 208 stops. By making the brushes 125 and 156 narrower than the segments 105 and 138, the motor is given a considerable amount of latitude as to its stopping position. In this way, the motor 208 may coast for several revolutions after de-energization, the number of revolutions depending on the design of gear train 220, without carrying the brush 156 on to the succeeding segment and thereby causing the system to hunt.

The brushes should, however, be made wider than the gaps between the segments in order that they may not stop between segments and thereby open the bridge circuit.

It should be noted that the unbalance voltage supplied to the input terminals of amplifier 174 varies in steps in accordance with the magnitude of the angular displacement between the shafts 106 and 151.

If now the rotation of crank 285 continues until the slider 125 crosses the gap between the terminal segments 107 and 108, either the first or second branch of the primary bridge circuit will be shunted through one of the resistances 179 or 180, respectively, through the connections previously traced.

The resistance elements 179 and 180, and the resistance elements 116 and 177 may be so chosen and proportioned, as previously explained, that when the transmitter slider crosses the gap ahead of the receiver slider, the unbalance signal applied to the amplifier is exactly the same, per contact segment displacement between the two sliders, as when the sliders are moving along the central parts of their respective resistance elements 101 and 138.

The motor 208 is chosen such that its full running speed is greater than the maximum speed of crank 285, so that the transmitter 100 can never get ahead of the receiver 135 by any appreciable amount. Nevertheless, the possibility remains that the transmitter shaft 106 might become displaced from the receiver shaft 151 by more than 180 degrees, and if this happened, the motor 208 might be reversed when the brush 125 crossed the gap, thereby causing the displacement between the transmitter and receiver pointers to increase. This might occur when the system is first placed in operation, if the transmitter is turned while the amplifier is first heating up.

The secondary bridge circuit including the variable resistance devices 225 and 226 is provided to prevent reversal of the motor when the shafts 106 and 151 are displaced by more than 180 degrees. The shafts 232 and 242, which operate the variable resistance devices 225 and 226, are geared down so that they rotate more slowly than the shafts 106 and 151. Since the drive shafts 232 and 242 rotate more slowly than the shafts 106 and 151, the resistance devices 225 and 226 are less sensitive to changes in position of the pointers 275 and 290 than are the resistance devices 101 and 138. The gear trains 280 and 286 are so designed, and the resistance elements 230 and 240 are so chosen and related to the characteristics of amplifier 254, that the signal applied to the input terminals of amplifier 254 is not effective to cause energization of either relay 264 or 268 until the displacement between the slider arms 233 and 243 has reached an amount corresponding to a displacement slightly less than 180 degrees between shafts 106 and 151. When such a displacement occurs, one of the relays 264 or 268 is energized, depending upon the direction of displacement of the receiver with respect to the transmitter, thereby causing either the first or second arms of the primary bridge circuit to be shunted, connecting the bridge output terminal represented by the contact ring 120 directly to either input terminal 160 or 161. Such a connection takes the variable resistance devices 101 and 138 completely out of control of motor 208, which is then controlled only by the displacement between the variable resistance devices 225 and 226. It may therefore be seen that if the shaft 151 becomes displaced by more than 180° from the angular position of the shaft 106, the variable resistance devices 225 and 226 will take control and operate motor 208 at its maximum speed until the position of pointer 290 again approaches correspondence with that of pointer 275.

No provision has been made in the system disclosed to prevent possible faulty operation of the system due to the sliders 234 and 244 getting positioned on the opposite sides of the gap in their respective slide-wire resistances 230 and 240. The gear ratio between shafts 232 and 106, and also the gear ratio between shafts 242 and 151, are so chosen that the shafts 106 and 151 would have to be displaced from each other by several revolutions before sliders 234 and 244 became separated sufficiently to lie on opposite sides of their respective resistance gap. Therefore, the possibility of the occurrence of such a condition is very remote. If in practice it became necessary to guard against such a condition, the secondary bridge circuit 257 could be provided with an arrangement for shunting a portion of it whenever the sliders became positioned on the opposite sides of their respective gaps, such as the arrangement provided for the primary bridge circuit.

While I have shown and described certain preferred embodiments of my invention, it will be readily understood that modifications thereof will readily appear to those who are skilled in the art, and I therefore wish to be limited only by the scope of the appended claims.

I claim as my invention:

1. In a balancable electrical network, in combination, a control potentiometer and a rebalancing potentiometer, each potentiometer including an impedance member and a rotatable contact member associated therewith, a conductive connection between each terminal of the control potentiometer impedance and a corresponding terminal of the rebalancing potentiometer impedance, each said connection including a fixed impedance element having an impedance equal to more than twice that of one of said impedance members, means responsive to unbalance of said network to drive said rebalancing potentiometer slider, and means effective upon relative movement of said control potentiometer contact directly from one terminal of its associated impedance to the opposite terminal to shunt a portion of said network including one of said fixed impedance elements, thereby unbalancing said network in a sense to cause said driving means to operate said rebalancing potentiometer slider directly from its corresponding one impedance terminal to its corresponding opposite impedance terminal.

2. In an electrical follow-up system, in combination, a continuously rotatable main controller and a continuously rotatable follow-up controller, each controller including impedance means adjustable in a series of substantially equal finite steps by operation of said controller, a controlling member operatively connected to said main controller through a motion reducing gear, a driven member operatively connected to said follow-up controller through a motion reducing gear, a single electrical circuit including both said impedance means, and means responsive to an electrical condition of said single circuit for controlling the operation of said follow-up controller and said driven member.

3. In a remote positioning system, in combination, a transmitter unit and a receiver unit, each unit comprising electrically cooperating relatively rotatable contact and impedance devices, electrical connections interconnecting said transmitter and receiver to form a bridge circuit having a pair of transmitter impedance terminals and a pair of receiver impedance terminals, electrical means responsive to an unbalance condition of said bridge circuit variable in sense in accordance with the direction of relative movement of said transmitter devices for controlling relative movement of said receiver devices to rebalance said bridge, compensating impedance means, connections between said compensating impedance means and said bridge circuit, and means operative as an incident to relative movement of said transmitter contact device directly from one of its impedance terminals to the other for changing the connections between said compensating impedance means and said bridge circuit to effectively unbalance said bridge circuit in a direction to cause corresponding relative movement of said receiver contact device directly from one of its impedance terminals to its other impedance terminal.

4. In a remote positioning system, in combination, a transmitter unit and a receiver unit, each unit comprising electrically cooperating relatively rotatable contact and impedance devices, electrical connections interconnecting said transmitter and receiver to form a bridge circuit having a pair of transmitter impedance terminals and a pair of receiver impedance terminals, electrical means responsive to an unbalance condition of said bridge circuit variable in sense in accordance with the direction of relative movement of said transmitter devices for controlling relative movement of said receiver devices to rebalance said bridge, variable compensating impedance means, connections between said compensating impedance means and said bridge circuit, means operative as an incident to relative movement of said transmitter contact device directly from one of its impedance terminals to the other for changing the connections between said compensating impedance means and said bridge circuit to effectively unbalance said bridge circuit in a direction to cause corresponding relative movement of said receiver contact device directly from one of its impedance terminals to its other impedance terminal, and means operable in accordance with the displacement between the angular positions of the rotatable devices of said transmitter and receiver for varying said variable compensating impedance.

5. A remote position control system, including in combination, a transmitter unit and a receiver unit, each unit comprising a stationary member and a movable member continuously rotatable about a center on said stationary member, one of said members in each unit comprising elongated impedance means, the other of said members in each unit comprising a slider for engaging said impedance, a normally balanced electrical network including said impedance and sliders, said network being balanced when said movable members are in corresponding angular positions relative to their respective stationary members, means responsive to unbalance of said network for driving the movable member of said receiver so as to rebalance said network, compensating impedance means normally disconnected from said network, means effective when said sliders engage opposite terminals of their respective associated impedance means to connect said compensating impedance means in parallel with a portion of said network, thereby unbalancing said network in a sense to cause said unbalance responsive means to drive the receiver slider directly between the terminals of its associated impedance means, and means effective when the displacement between the angular positions of said movable members exceeds a predetermined value to shunt a portion of said network so as to additionally unbalance said network.

6. Control apparatus comprising in combination, a main controller and a follow-up controller; each controller comprising first and second variable electrical devices, means for simultaneously varying the devices of the main controller at different rates, a first electrical network including both said first devices, a second electrical network including both said second devices, means responsive to unbalance of one of said networks for varying the devices of the follow-up controller at different rates so as to rebalance said networks simultaneously, and means responsive to a predetermined degree of unbalance in the other of said networks for additionally unbalancing said one network.

7. In an electrical follow-up system, a main controller and a follow-up controller, each controller including an impedance member tapped at a plurality of spaced points, a plurality of contact segments, one segment being connected to each of said taps, and a rotatable contact arm adapted to selectively engage said segments so as to vary the potential of said contact arm in a series of substantially equal finite steps, said segments being spaced circumferentially about the axis of rotation of said arm, so that said arm may be moved through a relatively short distance from electrical connection with one terminal of said impedance into electrical connection with the opposite terminal of said impedance, a controlling member operatively connected to the rotatable contact arm of said main controller, a driven member operatively connected to the rotatable contact arm of said follow-up controller, relay means operative in accordance with the relative electrical potentials of said main and follow-up contact arms for controlling the operation of said driven member and being effective to cause the rotatable arm of said follow-up controller to assume a position corresponding to the position of the arm of said main controller, an electrical network including said impedance members, and circuit means including switch means operable by said contact arms and completed when said contact arms are in electrical connection with opposite terminals of their corresponding impedance members to introduce an unbalance effect in said network such that said relay means is operated in a sense to cause the contact arm of the follow-up controller to move through the relatively short distance between one terminal of the follow-up impedance and the opposite terminal.

8. In an electrical follow-up system, a main controller and a follow-up controller, each controller including an impedance member tapped at a plurality of spaced points, a plurality of contact segments, one segment being connected to each of said taps, and a rotatable contact arm adapted to selectively engage said segments so as to vary the potential of said contact arm in a series of substantially equal finite steps, said segments being spaced circumferentially about the axis of rotation of said arm, so that said arm may be moved through a relatively short distance from electrical connection with one terminal of said impedance into electrical connection with the opposite terminal of said impedance, a controlling member operatively connected to the rotatable contact arm of said main controller, a driven member operatively connected to the rotatable contact arm of said follow-up controller, relay means operative in accordance with the relative electrical potentials of said main and follow-up contact arms for controlling the operation of said driven member and being effective to cause the rotatable arm of said follow-up controller to assume a position corresponding to the position of the arm of said main controller, an electrical network including said impedance members, compensating impedance means connectable in said network and effective when so connected to make the electrical potential between one terminal of the main impedance and the opposite terminal of the follow-up impedance substantially equal to one of said steps, and circuit means including said compensating impedance means, and switch means operable by said contact arms and completed when said contact arms are in electrical connection with opposite terminals of their corresponding impedance members to connect said compensating impedance means in said network so that said relay means is operated in a sense to cause the contact arm of the follow-up controller to move through the relatively short distance between one terminal of the follow-up impedance and the opposite terminal.

9. A normally balanced electrical network, comprising in combination, control means for producing in said network an unbalance effect variable within predetermined limits, means responsive to said unbalance effect for rebalancing said network, and means effective upon operation of said control means so as to produce a first unbalance effect greater than a predetermined value for shunting a part of said network so as to produce therein a second unbalance effect opposite to and greater than said first effect.

10. A normally balanced electrical network, comprising in combination, variable control impedance means for unbalancing said network, variable follow-up impedance means for rebalancing said network, means responsive to unbalance of said network for operating said follow-up impedance, variable compensating impedance means normally disconnected from said network, means effective in response to a predetermined degree of unbalance of said network for connecting said compensating impedance means in parallel with a portion of said network, and means for varying said compensating impedance means in accordance with the amount of unbalance in excess of said predetermined degree.

11. A remote position control system, including in combination, a transmitter unit and a receiver unit, each unit comprising a stationary member and a movable member continuously rotatable about a center on said stationary member, each stationary member comprising an elongated impedance element having terminals at each end and tap connections at a plurality of spaced points thereon, a row of arcuate contact segments spaced circumferentially and forming a substantially circular row about said center with the terminal segments at both ends of the row adjacent each other, and a conductive connection between each of said segments and one of said taps or terminals, said contacts being connected sequentially to said taps and terminals so that said terminals are connected to the two adjacent terminal segments, each movable member comprising a slider adapted to sequentially engage said contact segments, a balanceable network including said impedances, said network being balanced when said movable members are in corresponding angular positions with respect to said stationary members, means including an electronic amplifier responsive to unbalance of said network to drive said receiver movable member to an angular position corresponding to that of said transmitter movable member, and means including additional contacts engageable with said sliders and effective when said sliders engage segments on opposite sides of the space between said two adjacent terminal segments to unbalance said bridge in a sense to cause said driving means to operate said receiver slider across said space.

12. In an electrical bridge circuit, in combination, a control potentiometer and a rebalancing potentiometer, each of said potentiometers having relatively movable portions, one of said portions including an elongated impedance member having a longitudinally extending contact area and first and second electrical terminals, the other of said portions including contact means arranged for effectively unidirectionally cyclic motion in any selected one of a plurality of opposite senses, said unidirectional motion including an interval of movement of said means from said first terminal to said second terminal along said member and a second interval of movement of said means from said second terminal to said first terminal without intervening contact with said member, conductive connections between said first and second terminals of said control impedance member and said first and second terminals respectively of said rebalancing impedance member, each of said connections including a fixed impedance element having more than twice as much impedance as one of said impedance members, means oppositely responding to opposite unbalances of said network for driving said rebalancing slider in opposite directions with respect to said rebalancing impedance member, whereby movement of said control slider in a selected sense may result in movement of said rebalancing slider also in said selected sense, and means effective upon movement of said control slider continuously in a selected sense through said second portion of said cycle to shunt a portion of said network including one of said fixed impedance elements, whereby to independently establish such unbalance of said network as to maintain motion of said rebalancing slider in said selected sense.

13. An electrical bridge circuit comprising first and second variable impedances, means for operating said first impedance to unbalance said circuit, means responsive to unbalance of said circuit for operating said second impedance to rebalance said circuit, whereby continued operation of said first impedance in a selected sense may cause continued operation of said second impedance in a predetermined sense, said impedances having electrical discontinuities, compensating impedance means, and means associating said compensating impedance means and said circuit whereby to extend operation of said second impedance means in said predetermined sense during operation of said first impedance means through one of said discontinuities.

SIEGFRIED G. ISSERSTEDT.